United States Patent
Chu et al.

(10) Patent No.: US 10,832,265 B2
(45) Date of Patent: Nov. 10, 2020

(54) SYSTEM AND METHOD FOR COMBINING WHAT-IF AND GOAL SEEKING ANALYSES FOR PRESCRIPTIVE TIME SERIES FORECASTING

(71) Applicant: International Business Machines Corporation, Armonk, NY (US)

(72) Inventors: Yea-Jane Chu, Chicago, IL (US); Richard J. Oswald, Chicago, IL (US); Jean-Francois Puget, Saint Raphael (FR); Jing-Yun Shyr, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/367,818

(22) Filed: Dec. 2, 2016

(65) Prior Publication Data

US 2018/0158077 A1     Jun. 7, 2018

(51) Int. Cl.
*H04L 1/00*     (2006.01)
*G06Q 30/02*     (2012.01)
*G06N 5/02*     (2006.01)

(52) U.S. Cl.
CPC ......... *G06Q 30/0202* (2013.01); *G06N 5/022* (2013.01)

(58) Field of Classification Search
None
See application file for complete search history.

(56) References Cited

U.S. PATENT DOCUMENTS

| 7,707,091 | B1 | 4/2010 | Kauffman et al. | |
|---|---|---|---|---|
| 8,014,983 | B2 | 9/2011 | Crowe et al. | |
| 8,326,792 | B2 | 12/2012 | Goraya et al. | |
| 10,346,926 | B2* | 7/2019 | Eder | G06Q 10/06 |
| 2012/0010867 | A1* | 1/2012 | Eder | G06N 5/022 |
| | | | | 703/13 |
| 2013/0339089 | A1* | 12/2013 | Olsen | G06Q 30/0202 |
| | | | | 705/7.31 |

(Continued)

OTHER PUBLICATIONS

Yan et al., "Probabilistic Modelling for Hierarchical Time Series Forecasting", Database: ip.com; ip.com No. IPCOM000239722D, Nov. 27, 2014, 12 pages.

(Continued)

*Primary Examiner* — Thomas L Mansfield
(74) *Attorney, Agent, or Firm* — Richard Wilhelm; Edell, Shapiro & Finnan, LLC

(57) ABSTRACT

A computer-implemented method for prescriptive time-series forecasting, which combines both what-if analysis and goal-seeking analysis. The method comprises building a model for a target metric with a set of predictors, based on historical time-series data, and computing, using the model, a set of forecast values. Using the set of forecast values with respect to a forecasting period, both a set of goals for the target metric and a set of constraints for the predictors are analyzed. A set of updated forecasts based on the analyses with respect to the forecasting period is determined to meet the goals within the set of constraints. The updated set of forecasts is presented with respect to the forecasting period, e.g., using a table, a visualization, and/or an interactive user interface.

18 Claims, 11 Drawing Sheets

(56) References Cited

U.S. PATENT DOCUMENTS

| | | | |
|---|---|---|---|
| 2014/0180809 A1* | 6/2014 | Boal | G06Q 40/10 705/14.53 |
| 2015/0310343 A1 | 10/2015 | Netz et al. | |
| 2015/0317449 A1* | 11/2015 | Eder | G06Q 50/22 600/595 |
| 2016/0034615 A1 | 2/2016 | Heda et al. | |
| 2016/0055494 A1 | 2/2016 | Ni et al. | |
| 2016/0155137 A1* | 6/2016 | Harsha | G06Q 30/0202 705/7.31 |
| 2016/0284012 A1* | 9/2016 | Hom | G06Q 30/06 |

OTHER PUBLICATIONS

J. Chu, "What-If and Goal Seeking for Forecasting Models," presented at the Joint Statistical Meeting in Chicago, Illinois on Aug. 1, 2016, 14 pages (Grace Period Disclosure).
List of IBM Patents or Patent Applications Treated as Related, Dec. 2017, 1 Page.

\* cited by examiner

CREATE A SCENARIO (SCENARIO 1) 500

① SELECT ONE OR MORE TOP PREDICTORS TO INCLUDE WITH THE SALES TARGET. INCLUDE ONLY PREDICTORS THAT YOU CAN CHANGE.

TWITTER MENTIONS — 502   FACEBOOK MENTIONS — 504   PREDICTOR 3   PREDICTOR 4

② USE THE GRID TO LOCK VALUES FOR THE TARGET OR THE PREDICTORS. THE OTHER VALUES WILL BE UPDATED TO MEET THESE LOCKED VALUES. YOU CAN ALSO CONSTRAIN VALUES TO A SPECIFIED RANGE.

506

|  | JUNE 2015 | JUL 2015 | AUG 2015 | SEP 2015 | OCT 2015 | NOV 2015 |
|---|---|---|---|---|---|---|
| SALES | 89 | 102 | 108 | 115 | 110 | 103 |
| TWITTER MENTIONS | 122 | 140 | 154 | 172 | 160 | 146 |
| FACEBOOK MENTIONS | 97 | 108 | 120 | 144 | 139 | 121 |

③ UPDATE ALL FORECASTS

CREATE A SCENARIO (SCENARIO 1)

① SELECT ONE OR MORE TOP PREDICTORS TO INCLUDE WITH THE SALES TARGET. INCLUDE ONLY PREDICTORS THAT YOU CAN CHANGE.

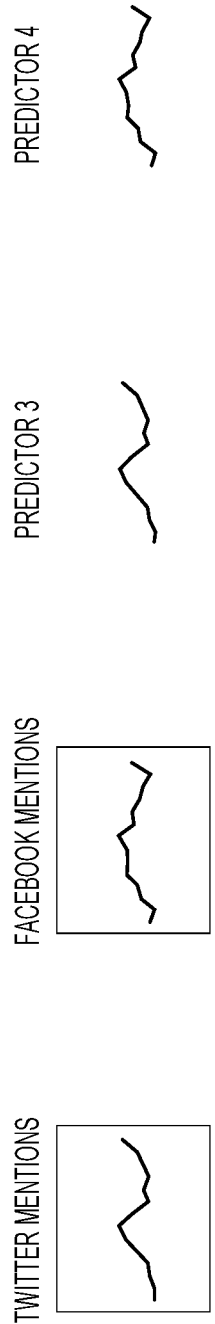

TWITTER MENTIONS     FACEBOOK MENTIONS     PREDICTOR 3     PREDICTOR 4

② USE THE GRID TO LOCK VALUES FOR THE TARGET OR THE PREDICTORS. THE OTHER VALUES WILL BE UPDATED TO MEET THESE LOCKED VALUES. YOU CAN ALSO CONSTRAIN VALUES TO A SPECIFIED RANGE.

|  | JUNE 2015 | JUL 2015 | AUG 2015 | SEP 2015 | OCT 2015 | NOV 2015 |
|---|---|---|---|---|---|---|
| SALES | 89 | 102 | 108 | 115 | 110 | 126 🔒 |
| TWITTER MENTIONS | 122 | 140 | 154 | 172 | 160 | 146 |
| FACEBOOK MENTIONS | 97 | 108 | 120 | 144 | 139 | 121 |

③ UPDATE ALL FORECASTS

FIG.8

CREATE A SCENARIO (SCENARIO 1)

500

① SELECT ONE OR MORE TOP PREDICTORS TO INCLUDE WITH THE SALES TARGET. INCLUDE ONLY PREDICTORS THAT YOU CAN CHANGE.

| TWITTER MENTIONS | FACEBOOK MENTIONS | PREDICTOR 3 | PREDICTOR 4 |

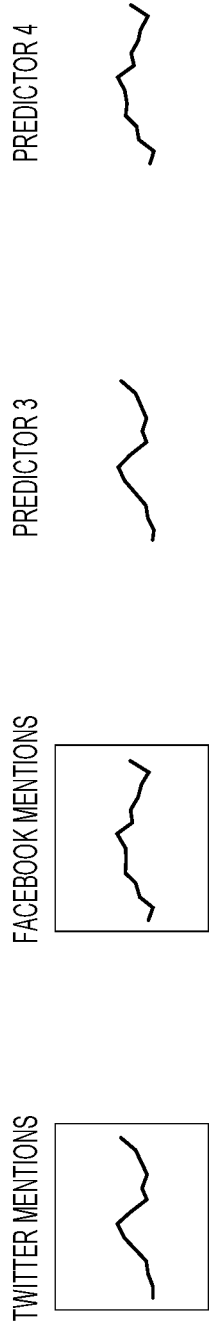

② USE THE GRID TO LOCK VALUES FOR THE TARGET OR THE PREDICTORS. THE OTHER VALUES WILL BE UPDATED TO MEET THESE LOCKED VALUES. YOU CAN ALSO CONSTRAIN VALUES TO A SPECIFIED RANGE.

|  | JUNE 2015 | JUL 2015 | AUG 2015 | SEP 2015 | OCT 2015 | NOV 2015 |
|---|---|---|---|---|---|---|
| SALES | 89 | 102 | 108 | 115 | 110 | 126 🔒 |
| TWITTER MENTIONS | 122 | 140 | 154 | 172 | 160 | 146 |
| FACEBOOK MENTIONS | 97 | 108 | 120 | 144 | 139 | 121 |

506

552  554

③ UPDATE ALL FORECASTS

CREATE A SCENARIO (SCENARIO 1)     500

① SELECT ONE OR MORE TOP PREDICTORS TO INCLUDE WITH THE SALES TARGET. INCLUDE ONLY PREDICTORS THAT YOU CAN CHANGE.

| TWITTER MENTIONS | FACEBOOK MENTIONS | PREDICTOR 3 | PREDICTOR 4 |
|---|---|---|---|
|  |  | 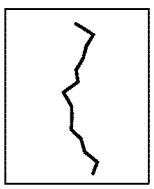 | 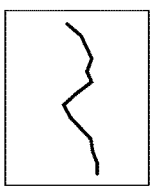 |

② USE THE GRID TO LOCK VALUES FOR THE TARGET OR THE PREDICTORS. THE OTHER VALUES WILL BE UPDATED TO MEET THESE LOCKED VALUES. YOU CAN ALSO CONSTRAIN VALUES TO A SPECIFIED RANGE.

|  | JUNE 2015 | JUL 2015 | AUG 2015 | SEP 2015 | OCT 2015 | NOV 2015 |
|---|---|---|---|---|---|---|
| SALES | 93 | 105 | 116 | 125 | 117 | 126 🔒 |
| TWITTER MENTIONS | 128 | 157 | 172 | 186 | 180 | 174 |
| FACEBOOK MENTIONS | 100 | 115 | 134 | 152 | 149 | 147 |

506

③ UPDATE ALL FORECASTS

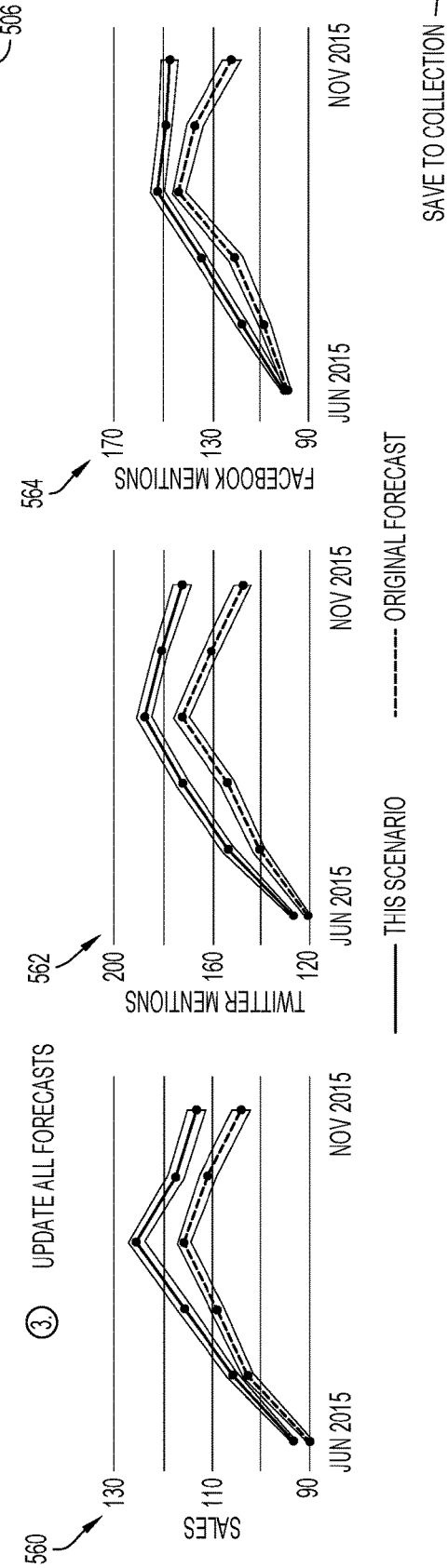

——— THIS SCENARIO  ------ ORIGINAL FORECAST  SAVE TO COLLECTION

FIG.11

SYSTEM AND METHOD FOR COMBINING WHAT-IF AND GOAL SEEKING ANALYSES FOR PRESCRIPTIVE TIME SERIES FORECASTING

STATEMENT REGARDING PRIOR DISCLOSURES BY THE INVENTOR OR A JOINT INVENTOR

The following disclosures(s) are submitted under 35 U.S.C. 102(b)(1)(A): DISCLOSURE(S): "What-If and Goal Seeking for Forecasting Models," J. Chu, presented at the Joint Statistical Meeting in Chicago, Ill. on Aug. 1, 2016, 14 pages.

BACKGROUND

1. Technical Field

Present invention embodiments relate to computer systems and methods for time series forecasting, and more specifically, to prescriptive time series forecasting combining what-if and goal seeking analyses.

2. Discussion of the Related Art

Many business and commerce metrics are recorded and stored as a time series, which is a sequence of observations taken at equally spaced points in time. Sales, expenses, earnings, customer satisfaction ratings, and other business metrics may be observed over time, and the values of the metrics may be recorded with an associated date or time. For example, total sales may be recorded for each month, and earnings may be reported each quarter.

Historical time series data for a business metric, such as sales, may be used by businesses to forecast future values of the metric. Users may take such forecasts into account when making business decisions. For example, if sales are forecast to drop in the next few months, then the business can budget appropriately, which is a proactive business decision to deal with an anticipated sales decline. However, because such forecasts are based on historical values of the metric that have already occurred and cannot be changed, they are of limited value to businesses that may be interested in changing the forecast.

SUMMARY

According to one embodiment of the present invention, a method of prescriptive time-series forecasting comprises building, based on historical time-series data, a model for a target metric with a set of predictors; computing, using the model, a set of forecast values; analyzing, using the set of forecast values with respect to a forecasting period, both a set of goals for the target metric and a set of constraints for the set of predictors; updating, to meet the set of goals for the target metric within the set of constraints for the set of predictors, the set of forecast values dynamically with respect to the forecasting period; and presenting, with respect to the forecasting period, the updated set of forecast values. In an embodiment, building the model is based on at least one selected from a group comprising a system-selected set of predictors and a user-input set of predictors, wherein the set of constraints includes at least one selected from a group comprising a set of user-expected values and a threshold range of change. In an embodiment, the updated set of forecast values minimizes a change from at least one selected from a group comprising the set of forecast values of both of the target and the predictors. In an embodiment, the presenting includes displaying to a user at least one selected from a group comprising a table, a visualization, and an interactive user interface. In an embodiment, the method further comprises receiving from a user via a user interface, prior to analyzing, at least one selected from a group comprising the set of goals for the target metric and the set of constraints for the set of predictors. In an embodiment, the method further comprises gathering, prior to building the model, historical time-series data from one or more online sources. In an embodiment, the method further comprises initiating, based on the updated set of forecast values, a computer process to achieve at least one of the goals for the target metric by influencing a value of at least one of the predictors.

According to another embodiment of the present invention, a system for prescriptive time-series forecasting comprises at least one processor configured to: build, based on historical time-series data, a model for a target metric with a set of predictors; compute, using the model, a set of forecast values; analyze, using the set of forecast values with respect to a forecasting period, both a set of goals for the target metric and a set of constraints for the set of predictors; update, to meet the set of goals for the target metric within the set of constraints for the set of predictors, the set of forecast values dynamically with respect to the forecasting period; and present, with respect to the forecasting period, the updated set of forecast values. In an embodiment, the at least one processor is configured to build the model based on at least one selected from a group comprising a system-selected set of predictors and a user-input set of predictors. In an embodiment, the set of constraints includes at least one selected from a group comprising a set of user-expected values and a threshold range of change. In an embodiment, the updated set of forecast values minimizes a change from at least one selected from a group comprising the set of forecast values of both of the target and the predictors. In an embodiment, the at least one processor is configured to present by displaying to a user at least one selected from a group comprising a table, a visualization, and an interactive user interface. In an embodiment, the at least one processor is further configured to receive from a user via a user interface, prior to analyzing, at least one selected from a group comprising the set of goals for the target metric and the set of constraints for the set of predictors.

According to yet another embodiment of the present invention, a computer program product for prescriptive time-series forecasting is provided, the computer program product comprising a computer readable storage medium having program instructions embodied therewith, the program instructions executable by a computer processor to cause the computer processor to build, based on historical time-series data, a model for a target metric with a set of predictors; compute, using the model, a set of forecast values; analyze, using the set of forecast values with respect to a forecasting period, both a set of goals for the target metric and a set of constraints for the set of predictors; update, to meet the set of goals for the target metric within the set of constraints for the set of predictors, the set of forecast values dynamically with respect to the forecasting period; and present, with respect to the forecasting period, the updated set of forecast values. In an embodiment, the program instructions include instructions executable by a computer processor to cause the computer processor to build the model based on at least one selected from a group comprising a system-selected set of predictors and a user-input set of predictors. In an embodiment, the set of constraints includes at least one selected from a group comprising a set of user-expected values and a threshold range of change. In an embodiment, the updated set of forecast values minimizes a change from at least one selected from a group comprising the set of forecast values of both of the target and the predictors. In an embodiment, the program instructions include program instructions executable by a computer processor to present to a user at least one selected from a group comprising a table, a visualization, and an interactive user interface. In an embodiment, the program instructions further comprise program instructions executable by a computer processor to receive from a user via a user interface, prior to analyzing, at least one selected from a group comprising the set of goals for the target metric and the set of constraints for the set of predictors.

BRIEF DESCRIPTION OF THE DRAWINGS

Generally, like reference numerals in the various figures are utilized to designate like components.

FIG. 5 is a diagrammatic illustration of an example of a user interface for selecting one or more predictors when creating a new scenario according to an embodiment of the present invention.

FIG. 8 is a diagrammatic illustration of an example of a user interface showing the changed value of the target metric when creating a new scenario according to an embodiment of the present invention.

FIG. 10 is a diagrammatic illustration of an example of a user interface for displaying locking and constraint status of values and providing an option to update all forecasts when creating a new scenario according to an embodiment of the present invention.

FIG. 11 is a diagrammatic illustration of an example of a user interface for displaying updated forecasted values for the new scenario according to an embodiment of the present invention.

DETAILED DESCRIPTION

Figure 1:
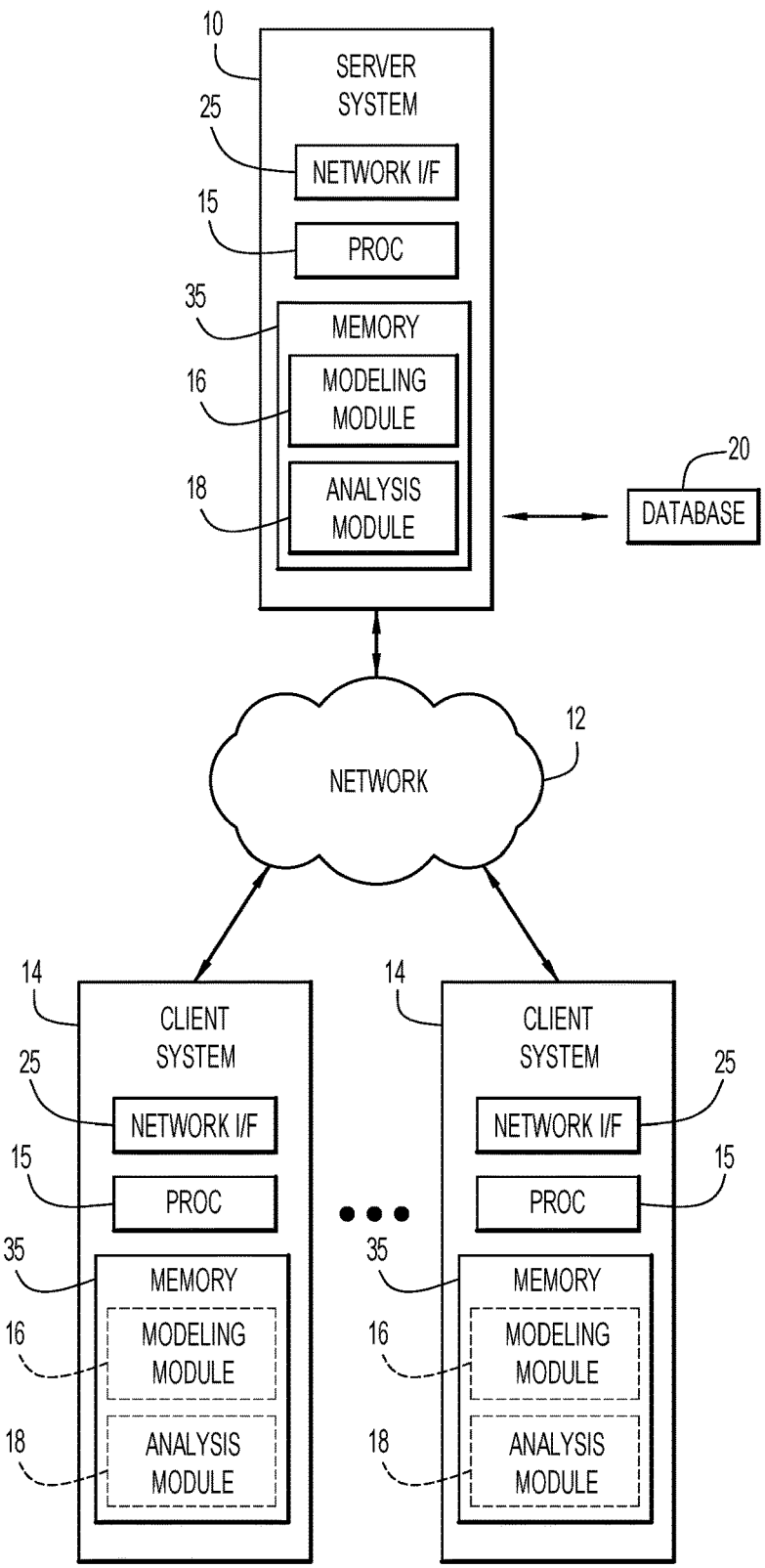
FIG. 1 is a diagrammatic illustration of an example computing environment implementing an embodiment of the present invention.

An aspect of present invention embodiments is to forecast future values of a target metric, such as sales, for a specified forecasting period. In the case of sales, because of the auto-correlation nature of sales series data, some statistical models, such as exponential smoothing, autoregressive integrated moving average (ARIMA), etc., can be built based on the target metric's past values to account for the historical patterns and may be used to forecast future sales values.

On the other hand, some time series models, such as transfer function models, Granger causality models (which we call temporal causal models), etc., can be built to describe the causal relationships between the target series (e.g., sales) and predictor series (other series) to forecast future sales values. Such models can help users take better business actions to interact with the forecasts. For example, suppose that the number of Twitter mentions affects sales. If sales are forecast to drop in the next few months, then the business can change the future number of Twitter mentions to cause sales forecasts to increase. Because this type of model is based on other predictor series in addition to historical values of the target metric, the forecasts of the target metric might be changed due to some updated forecasts of predictor series.

The present invention embodiment provides the user with two techniques when the user wants to interact with forecasts, i.e., change the forecasts of the target metric. One is what-if analysis, and the other is goal seeking. Both of these options use the time series models with some predictors to generate new forecasts based on the user's desired outcomes.

In what-if analysis, a user manually sets the forecasts for one or more input or predictor time series to see the repercussions in the target time series. The analysis answers the question: "What if I increase (or decrease) a metric in the future?" For example, assume that the target metric is sales, and the number of Twitter Mentions affects sales. The user might change the forecast for number of Twitter mentions to see the effect on sales (e.g., "What if I increase the number of Twitter mentions from 50 to 60 in July 2015?").

In goal seeking, a user manually sets the forecasts for a target time series and then requests new forecasts for the predictor time series. Goal seeking analysis answers the question: "What values of the predictor time series will allow me reach my goal?" For example, the user might set a goal for sales and request new forecasts for the number of Twitter mentions (e.g., "What values of the number of Twitter mentions will allow me to reach sales of 120 in December, 2015?") Goal seeking provides recommended actions based on the user's desired outcomes.

With reference now to FIGS. 1-12, examples of a computer-implemented system and method for time-series forecasting which combines both what-if analysis and goal-seeking analysis are described. In an example embodiment, the present invention includes building a model for a target metric with a set of predictors, and analyzing a set of goals for the target metric and a set of constraints for the set of predictors using the model. An updated forecast based on the analysis with respect to a forecasting period may be determined to meet the goals within the constraints. The updated forecast may be presented with respect to the forecasting period, and the presenting may include displaying the dynamic forecast to a user as a table, a visualization, or an interactive user interface. In example embodiments, the method may also include initiating processes to obtain historical time-series data from local or remote online data sources, and/or initiating processes to achieve at least one of the goals for the target metric by influencing a value of at least one of the predictors.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

In an example embodiment, server systems 10 may include a modeling module 16 to build a model for a target metric based on historical time-series data for the target metric and a set of predictors, and an analysis module 18 for analyzing a set of goals for the target metric and a set of constraints for the set of predictors. Client systems 14 enable a user to view forecasted values of the target metric generated by server systems 10 using the model, and may also enable users to cause the server to generate scenarios for the target metric to meet specified goals within specified constraints with respect to a forecasting period. For example, client systems 14 may enable users to specify goals for the target metric and/or constraints for predictors of the target metric, which may be used by the server systems 10 to generate a dynamic forecast to meet the goals within the constraints. A database system 20 may store various information for the analyses (e.g., historical time-series data). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user interface (e.g., GUI, etc.) or other interface (e.g., command line prompts, menu screens, etc.) to display forecasted values and accept input from users (e.g., goals for the target metric, constraints for the set of predictors, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, modeling module, analysis module, modules 16 and 18, browser/interface software, etc.).

Alternatively, one or more client systems 14 may build the model and/or perform the what-if and goal-seeking analyses in a stand-alone mode of operation. In a stand-alone mode of operation, the client system stores or has access to the data (e.g., database 20), and includes module 16 to build the model and/or module 18 to perform analyses using the model. The graphical user interface (e.g., GUI, etc.) or other interface (e.g., command line prompts, menu screens, etc.) presents forecasted values to a user and accepts inputs from a user.

Modules 16 and 18 may be combined into a single module. Alternatively, modules 16 and 18 may be separate as shown, and it will be appreciated that either or both modules may include one or more modules or units to perform the various functions of present invention embodiments described below. The various modules (e.g., modules 16 and 18) may be implemented by any combination of any quantity of software and/or hardware modules or units, and may reside within memory 35 of the server and/or client systems for execution by processor 15.

Figure 2:
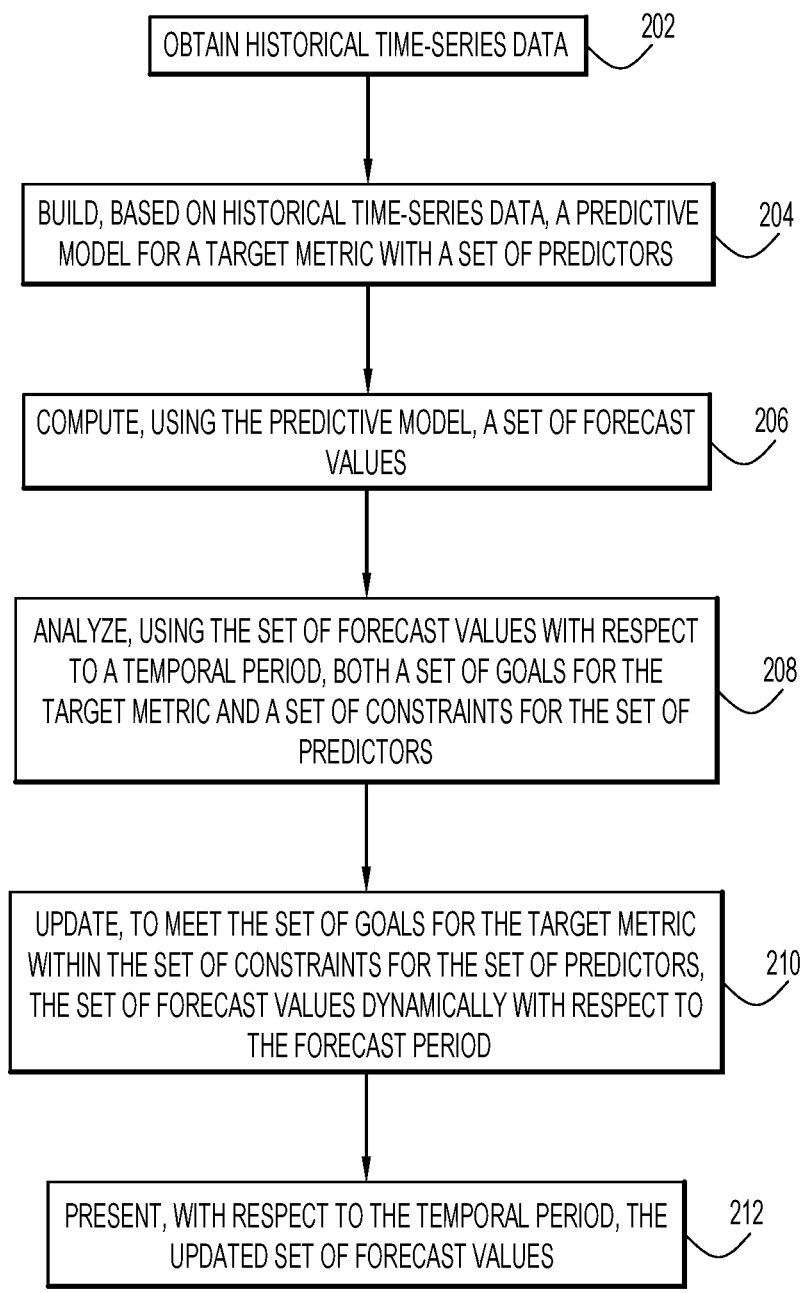
FIG. 2 is a procedural flowchart illustrating a manner of combining what-if and goal seeking analyses according to an embodiment of the present invention.

A manner of performing prescriptive forecasting according to an example embodiment is illustrated in FIG. 2 at 200. Initially, historical time-series data are obtained at step 202 (e.g., via software running on at least one server system 10 and/or a client system 14). The time-series data may be for a target metric ($y_t$) and one or more independent variables or predictors ($X_{i,t}$) that may have an effect on the target metric. The historical time-series data may be obtained in response to a user request (e.g., whenever a prescriptive forecast is requested), or at scheduled times (e.g., quarterly), or at any other time. The historical time series data may be obtained from database 20, remote sources (e.g., online databases, webcrawlers, or services), and/or other sources (e.g., user uploaded data). The predictors may be identified before the historical time-series data is obtained, or the predictors may be identified after obtaining the historical time-series data. Several different statistical techniques can identify predictors and build a model, such as temporal causal modeling, transfer function models (ARIMA+predictors), etc. The system can automatically check all possible predictors to identify the most important ones. Users could also manually select predictors, but it might be more efficient or faster if the system does the selection automatically.

Once the predictors ($X_{i,t}$) have been identified, a model is built for the target metric ($y_t$) based on the historical data (t=1, . . . , T) for the target metric and the predictors at step 204 (e.g., via modeling module 16 and at least one server system 10 and/or a client system 14). For example, assume the system identifies the top K predictors, $X_{i,t}$, i=1, . . . , K, for the target series, $y_t$, with the following transfer function model:

$$z_t = f(y_t) = \begin{cases} y_t, & \text{if no tranformation for } y_t \\ \ln(y_t), & \text{if the transformation of } y_t \text{ is loglogarithm} \\ \sqrt{y_t}, & \text{if the transformation of } y_t \text{ is square root} \end{cases} \quad (1)$$

$$\Delta z_t = c + \sum_{i=1}^{k} \frac{\omega_i(B)}{\delta_i(B)} \Delta_i B^{b_i} f_i(X_{it}) + \frac{\theta^*(B)}{\phi^*(b)} a_t$$

$$z_t = c - \sum_{\ell=1}^{L_d} \tau_\ell \cdot z_{t-\ell} + \sum_{i=1}^{K} \frac{\omega_i(B)}{\delta_i(B)} \Delta_i B^{b_i} f_i(X_{i,t}) + N_t$$

where
  c is the constant parameter;
  $a_t$ is the unobserved i.i.d. Gaussian error process with mean of zero and variance of $\sigma^2$;
  The moving average lag polynomial $\theta^*(B) = \theta_q(B)\Theta_Q(B^1)$ with $\theta_q(B) = 1 - \vartheta_1 B - \vartheta_2 B^2 - \ldots - \vartheta_q B^q$ and $\Theta_Q(B^s) = 1 - \Theta_1 B^s - \Theta_2 B^{2s} - \ldots - \Theta_Q B^{Qs}$; and s is the periodicity of the data;
  The auto-regressive lag polynomial $\phi^+(B) = \phi_p(B)\phi_p(B^s)$ with $\phi_p(B) = 1 - \varphi_1 B - \varphi_2 B^2 - \ldots - \varphi_p B^p$ and $\phi_p(B^2) = 1 - \phi_1 B^s - \phi_2 B^{2s} - \ldots - \phi_p B^{Pz}$;
  $N_t$ is the noise series, with $$N_t = \frac{\theta^*(B)}{\phi^*(B)} a_t;$$

$\Delta$ is the difference operator with the order of $L_\alpha$, where $\Delta = (1-B)^d(1-B^s)^D = 1 + \tau_1 B + \ldots + \tau_{L_d} B^{L_d}$;
  $\omega_i(B)$ and $\delta_i(B)$ are numerator and denominator terms for the $i^{th}$ predictor with the order of $L_{\omega_i}$ and $L_{\delta_i}$, respectively, where $$\omega_i(B) = \omega_{i0} + \omega_{i1}B + \ldots + \omega_{iL_{\omega_i}} B^{L_{\omega_i}}$$

and $$\delta_i(B) = 1 + \delta_{i1}B + \ldots + \delta_{iL_{\delta_i}} B^{L_{\delta_i}},$$

respectively; i=1, . . . , K;
$\Delta_i$ is the difference operator with the order of $L_{i,d}$ for the $i^{th}$ predictor, where $$\Delta_i = (1-B)^{d_i}(1-B^s)^{D_i} = 1 + \tau_{i,1}B + \ldots + \tau_{i,L_{i,d}} B^{L_{i,d}};$$

i=1, . . . , K;
$B^{b_i}$ is a delay term with the order of $b_i$, i=1, . . . , K;
$f_i(\bullet)$ is the transformation function for the $i^{th}$ predictor and $f_i(\bullet)=f(\bullet)$;
the transfer function $$V_{i,t|T} = \frac{\omega_i(B)}{\delta_i(B)} \Delta_i B^{b_i} f_i(X_{i,t|T})$$

can be computed as $$V_{i,t} = -\sum_{l=1}^{L_{\delta_i}} \delta_{il} \cdot V_{i,t-l} + \sum_{l=0}^{L_{\omega_i}} \omega_{il} \cdot \Delta_i B^{b_i} f_i(X_{i,t-l}). \quad (2)$$

For example, if the target metric ($y_t$) is sales and the system identifies two predictors: number of Twitter mentions ($X_{1,t}$ or Twitter #) and number of Facebook mentions ($X_{2,t}$ or Facebook #), the following transfer function model can be built:

$$y_t = c + \frac{\omega_{1,0} + \omega_{1,1}B}{1 + \delta_{1,1}B + \delta_{1,2}B^2} X_{1,t} + \frac{\omega_{2,0} + \omega_{2,1}B + \omega_{2,2}B^2}{1 + \delta_{2,1}B} X_{2,t} + N_t$$

$$= c + V_{1,t} + V_{2,t} + N_t$$

$$V_{1,t} = -\delta_{1,1}V_{1,t-1} - \delta_{1,2}V_{1,t-2} + \omega_{1,0}X_{1,t} + \omega_{1,1}X_{1,t-1}$$

$$V_{2,t} = -\delta_{2,1}V_{2,t-1} + \omega_{2,0}X_{2,t} + \omega_{2,1}X_{2,t-1} + \omega_{2,2}X_{2,t-2}$$

where
$c = 17.6$, $\delta_{1,1} = -0.22$, $\delta_{1,2} = 0.98$, $\omega_{1,0} = 0.02$, $\omega_{1,1} = 0.16$, $\delta_{2,1} = -0.57$, $\omega_{2,0} = 0.36$, $\omega_{2,1} = -0.15$, $\omega_{2,2} = 0.54$.

In step 206, the built model may be used to forecast future values. The forecasts for $y_t$, $y_{t|T}$, at the current time T for several time points over the forecasting period, T+1, . . . , T+h, can be computed based on Equations (1) and (2) as follows:

$$z_{t|T} = c - \sum_{l=1}^{L_d} \tau_l \cdot z_{t-l|T} + \sum_{i=1}^{K} \frac{\omega_i(B)}{\delta_i(B)} \Delta_i B^{b_i} f_i(X_{i,t|T}) + N_{t|T} \quad (3)$$

$$y_{t|T} = \begin{cases} z_{t|T}, & \text{if no tranformation for } y_t \\ \exp\left(z_{t|T} + \frac{\sigma^2_{z_{t|T}}}{2}\right), & \text{If the transformation of } y_t \text{ is log} \\ (z_{t|T})^2 + \sigma^2_{z_{t|T}}, & \text{If the transformation of } y_t \text{ is square root} \end{cases} \quad (4)$$

$$V_{i,t|T} = -\sum_{l=1}^{L_{\delta_i}} \delta_{il} \cdot V_{i,t-l|T} + \sum_{l=0}^{L_{\omega_i}} \omega_{il} \cdot \Delta_i B^{b_i} f_i(X_{i,t-l|T}) \quad (5)$$

where $$z_{t|T} =$$

$$f(y_t) = \begin{cases} y_t, & \text{if no tranformation for } y_t \\ \ln(y_t), & \text{if the transformation of } y_t \text{ is loglogarithm} \\ \sqrt{y_t}, & \text{if the transformation of } y_t \text{ is square root} \end{cases}$$

$V_{i,t|T} = V_{i,t}$, $X_{i,t|T} = X_{i,t}$, $i = 1, \ldots, K$, if $t \le T$;

i.e., the forecasted values would be historical values if they happened before or at the current time T. On the other hand, the system will build models for predictor series to compute their forecasts, $X_{i,t-l|T}$, $_{t-l>T}$ if the user doesn't provide the forecasts for the predictor series.

The forecasting values based on historical data can be displayed as shown in Table 1:

TABLE 1

Historical and forecasting values for the target and predictors

| Metrics | ... | T − 1 | T | T + 1 | T + 2 | ... | T + h |
|---|---|---|---|---|---|---|---|
| $y_t$ | ... | $y_{T-1}$ | $y_T$ | $y_{T+1|T}$ | $y_{T+2|T}$ | | $y_{T+h|T}$ |
| $X_{1,t}$ | ... | $X_{1,T-1}$ | $X_{1,T}$ | $X_{1,T+1|T}$ | $X_{1,T+2|T}$ | | $X_{1,T+h|T}$ |
| . | | | | | | | |
| . | | | | | | | |
| $X_{K,t}$ | ... | $X_{2,T-1}$ | $X_{2,T}$ | $X_{K,T+1|T}$ | $X_{K,T+2|T}$ | | $X_{K,T+h|T}$ |

For the sales example above, the forecasts at the current time (e.g., 6/15) and for the next 6 months (e.g., 7/15, 8/15, 9/15, 10/15, 11/15, and 12/15) based on Equation (2) along with forecasts of number of Twitter mentions and number of Facebook mentions can be displayed as shown in Table 2:

TABLE 2

Historical and forecasting values for Sales, Twitter# and Facebook#

| Metrics | ... | May 2015 | June 2015 | July 2015 | August 2015 | September 2015 | October 2015 | November 2015 | December 2015 |
|---|---|---|---|---|---|---|---|---|---|
| Sales | ... | 95 | 90 | 100 | 103 | 108 | 110 | 114 | 115 |
| Twitter# | ... | 50 | 55 | 50 | 55 | 48 | 56 | 55 | 60 |
| Facebook# | ... | 45 | 45 | 50 | 50 | 53 | 51 | 50 | 50 |

After the predictors are identified and one or more models are built, the user can specify the desired analysis in step 208 (e.g., via analysis module 18 and at least one server system 10 and/or a client system 14). The analyses may include goals for the target metric series or constraints for the predictor series or both. Such goals and/or constraints may be defined for the future time points over a forecasting period.

Goals can be entered one at time or automatically distributed from a coarser (e.g., higher granularity) time period. For example, assume the original measurements and forecasts are recorded and generated at a monthly level. If the user specifies a yearly goal, the system can be configured to automatically distribute the yearly goal over monthly forecasts.

In example embodiments, constraints can be entered for one or more predictors, for one or more future time points in the forecasting period, or for expected values for the predictors. For example, the system may be configured to allow the following two types of constraints to be entered: (a) the user may be allowed to enter specific values for specific predictor series; and/or (b) the user may be allowed to enter an allowable range of change for the predictor series.

Table 3 below illustrates an example of how goals and constraints can be entered by a user. In the example shown in Table 3, two goal values are entered for the Sales series in different months: 110 for September 2015 and 120 for December 2015 (sales may reflect the number of units sold, revenue, or any other appropriate sales metric). In addition, the user entered a Sales goal of 700 for the second half of 2015. An expected value of 60 is specified for Twitter # in July 2015. A range constraint of (48, 52) is also identified for Facebook # for July 2015. The goals and constraints entered by the user in this example are shown in bold to the right of the original values in Table 3. Thus Table 3 represents an example combination of what-if and goal seeking analyses.

The cells in Table 3 that include question marks to the right of the original values indicate forecasted values that will be solved by the system. These may be considered "decision variables" in the optimization problem. The solution may contain forecasts that were previously generated or that will be updated by system.

$\tilde{z}_t$: Decision variable for transformed target series at time t is solved in the optimization problem, $t = T - L^* + 1, \ldots, T+h$, where $L^* = L_d$;

$\tilde{X}_{i,t}$: Decision variable for the $i^{th}$ predictor series at time t is solved in the optimization problem $t = T - L^{} + 1, \ldots, T+h$, where $L^{} = b_i + L_{i,d} + L_{\omega_i}$, $i \in \{1, \ldots, K\}$, (because it is possible that some predictors aren't allowed to change);

$\tilde{V}_{i,t}$: Decision variable for the transfer function of the $i^{th}$ predictor series at time t is solved in the optimization problem, $t = T - L^{*} + 1, \ldots, T+h$, where $L^{*} = L_{\delta_i}$, $i \in \{1, \ldots, K\}$.

Then the constrained optimization problem can be formulated with the following objective function and several types of constraints: Minimize the change between the original forecasting values and the updated forecasting values, which are the decision variables that need to be solved, of the target and predictors for all time points in the forecasting period:

$$\min_{\substack{\tilde{y}_t, \tilde{X}_{i,t}, \\ \tilde{z}_t, \tilde{y}_{i,t}}} \left( \sum_{t=T+1}^{T+h} (\tilde{y}_t - y_{t|T})^2 + \sum_{i=1}^{K} \sum_{t=T+1}^{T+h} (\tilde{X}_{i,t} - X_{i,t|T})^2 \right) \quad (6)$$

subject to the following constraints:

(a) Historical data cannot be changed:

$$\tilde{y}_t = y_t \text{ and } \tilde{X}_{i,t} = X_{i,t}, t \leq T$$

All updated values (solutions) are satisfied with the time series model, i.e., replaced with the decision variables for the target and predictors in Equations (1) and (2), for (b) $t = T + 1, \ldots, T + h,$ \quad (7)

$$\tilde{z}_t = c - \sum_{\ell=1}^{L_d} \tau_\ell \cdot \tilde{z}_{t-\ell} + \sum_{i=1}^{K} \tilde{V}_{i,t} + \hat{N}_{t|T}$$

TABLE 3

Goal and constrained values entered by the user

| Metrics | July 2015 | | August 2015 | | September 2015 | | October 2015 | | November 2015 | | December 2015 | |
|---|---|---|---|---|---|---|---|---|---|---|---|---|
| Sales | 100 | ? | 103 | ? | 108 | 110 | 110 | ? | 114 | ? | 115 | 120 |
| Twitter# | 50 | 60 | 55 | ? | 48 | ? | 56 | ? | 55 | ? | 60 | ? |
| Facebook# | 50 | ?(48, 52) | 50 | ? | 53 | ? | 51 | ? | 50 | ? | 50 | ? |

* Sum of Sales from July 2015 to December 2015 = 700

In step 210, the system updates the forecast by solving the optimization problem. The analysis that was defined by setting target goals and entering predictor constraints can be formulated as a constrained optimization problem, and a solution can be found that meets the goals of the target and satisfies the constraints of predictors by minimizing the change from the original forecasts.

First, the decision variables to be solved in the optimization problem are defined. Note that, in this example, all variables include both historical and forecasting periods.

$\tilde{y}_t$: Decision variable for target series at time t is solved in the optimization problem, $t = T - L^* + 1, \ldots, T+h$, where $L^* = L_d$;

-continued $$\tilde{y}_t = \begin{cases} \tilde{z}_t, & \text{if } y_t \text{ is not tranformed} \\ \exp\left(\tilde{z}_t + \dfrac{\sigma^2_{z_{t|T}}}{2}\right), & \text{if the transformation of } y_t \text{ is log} \\ (\tilde{z}_t)^2 + \sigma^2_{z_{t|T}}, & \text{if the transformation of } y_t \text{ is square root} \end{cases} \quad (8)$$

$$\tilde{V}_{i,t} = -\sum_{\ell=1}^{L_{\delta_i}} \delta_{i\ell} \cdot \tilde{V}_{i,t-\ell} + \sum_{\ell=0}^{L_{\omega_i}} \omega_{i\ell} \cdot \Delta_i B^{b_i} f_i(X_{i,t-\ell}) \quad (9)$$

where $\hat{N}_{t|T}$ is the forecast of the noise series at the current time T for time t in the forecasting period which can be extracted from the model; and for historical time points, $t-\ell' \leq T$, $\tilde{V}_{i,t-l} = V_{i,t-l}$ and $$\tilde{z}_{t-l} = z_{t-l} = f(y_{t-l}) = \begin{cases} y_{t-l}, & \text{if no tranformation for } y_t \\ \ln(y_{t-l}), & \text{if no tranformation for } y_t \text{ is logarithm} \\ \sqrt{y_{t-l}}, & \text{if no tranformation for } y_t \text{ is square root} \end{cases}$$

(c) The equality constraints, which are the goal values for the target and the expected values for predictors, are honored $$\tilde{X}_{i,t'} = C_{i,t'}, t' \in \{T+1, \ldots, T+h\} i \in \{1, \ldots, K\} \quad (c.1)$$

$$\tilde{y}_{t'} = g_{t'}, t' \in \{T+1, \ldots, T+h\} \quad (c.2)$$

(c.3) Suppose $G_{T'}$ is the specified goal value in the higher granularity than the current time interval such that T' will cover some or all of forecasting periods, T+1, ..., T+h and some or all of historical periods, T−L'+1, ..., T, which covers m time points, then the constraint can be stated as follows:

$$\Sigma_{t' \in \{T-L'+1, \ldots, T+h\}} \tilde{y}_{t'} = \begin{cases} G_{T'} & \text{if aggregation function for } y_t \text{ is sum} \\ mG_{T'} & \text{if aggregation function for } y_t \text{ is average} \end{cases}$$

where L' could be smaller or larger than L*.
(d) The range constraints:

$$L_{i,t} \leq \tilde{X}_{i,t} \leq U_{i,t}, t \in \{T+1, \ldots, T+h\}, i \in \{1, \ldots, K\}$$

However, to avoid the no solution issue by range constraints in (d), the above problems may be modified by moving the equality constraints (c.1) and (c.2) as part of the objective function. Then the objective function in Equation (6) can be modified as follows:

$$\min_{\tilde{y}_t, \tilde{X}_{i,t}, \tilde{z}_t, \tilde{V}_{i,t}} \left( \sum_{t=T+1}^{T+h} w_{0,t} (\tilde{y}_t - g_{0,t})^2 + \sum_{i=1}^{K} \sum_{t=T+1}^{T+h} w_{i,t} (\tilde{X}_{i,t} - g_{i,t})^2 \right) \quad (10)$$

where $g_{0,t}$ and $g_{i,t}$ default to $y_{t|T}$ and $X_{i,t|T}$, respectively, unless there is a user defined goal value.

$$w_{0,t} = \frac{\sigma_{y_{T+h|T}}^2}{\sigma_{y_{t|T}}^2} \cdot \frac{1}{\mu_0^2 + \sigma_0^2} \cdot a^{I(g_{0,t} \text{ is user defined})},$$

$$w_{i,t} = \frac{1}{\mu_i^2 + \sigma_i^2} \cdot b^{I(g_{i,t} \text{ is user defined})},$$

i=1, 2, ..., K. $\mu_0$ and $\mu_i$ are the mean of the target series and $i^{th}$ predictor series, respectively. $\sigma_0$ and $\sigma_i$ are the standard deviation of the target series and the $i^{th}$ predictor series, respectively. $\sigma_{y_{t|T}}^2 = \sigma_{z_{t|T}}^2$ for transfer function model because $\sigma_{y_{t|T}}^2$ is not available. The constant a and b default to 10,000 and 1,000, respectively.

For the Sales example, the decision variables are $\tilde{y}_t$, $\tilde{X}_{1,t}$, $\tilde{X}_{2,t}$, t=5/15, ..., 12/15, (including 2 historical and 6 forecasting time points), both goal seeking and what-if analyses are to solve the following constrained optimization with respect to the decision variables which the objective function is based on Equation (10):

$$\min_{\substack{\tilde{y}_t, \tilde{X}_{i,t} \\ \tilde{V}_{i,t}}} \left( \sum_{\substack{t=7/15 \\ t \neq 9/15, 12/15}}^{12/15} (\tilde{y}_t - y_{t|6/15})^2 + \sum_{\substack{t=7/15 \\ t \neq 7/15}}^{12/15} (\tilde{X}_{1,t} - X_{1,t|6/15})^2 + \sum_{t=7/15}^{12/15} (\tilde{X}_{2,t} - X_{2,t|6/15})^2 + 100(\tilde{y}_{9/15} - 110)^2 + 100(\tilde{y}_{12/15} - 120)^2 + 13(\tilde{X}_{1,7/15} - 60)^2 \right)$$

s.t.

(a) $\tilde{y}_t = y_t$ and $\tilde{X}_{i,t} = X_{i,t}$, t = 5/15, 6/15;

(b) $\tilde{y}_t = c + \tilde{V}_{1,t} + \tilde{V}_{2,t} + \hat{N}_{t|T}$, $\tilde{V}_{1,t} = -\delta_{1,1} \tilde{V}_{1,t-1} - \delta_{1,2} \tilde{V}_{1,t-2} + \omega_{1,0} \tilde{X}_{1,t} + \omega_{1,1} \tilde{X}_{1,t-1}$, $\tilde{V}_{2,t} = -\delta_{2,1} \tilde{V}_{2,t-1} + \omega_{2,0} \tilde{X}_{2,t} + \omega_{2,1} \tilde{X}_{2,t-1} + \omega_{2,2} \tilde{X}_{2,t-2}$, t = 7/15, ..., 12/15;

where c = 17.6, $\delta_{1,1} = -0.22 \delta_{1,2} = 0.98$, $\omega_{1,0} = 0.02$, $\omega_{1,1} = 0.16$, $\delta_{2,1} = -0.57$, $\omega_{2,0} = 0.36$, $\omega_{2,1} = -0.15$, $\omega_{2,2} = 0.54$, $V_{1,5/15} = 4.16$, $V_{1,6/15} = 7.26$, $V_{2,6/15} = 68.15$, $\hat{N}_{7/15} = 2.24$, $\hat{N}_{8/15} = -1.69$, $\hat{N}_{9/15} = 1.28$, $\hat{N}_{10/15} = -.97$, $\hat{N}_{11/15} = .73$ and $\hat{N}_{12/15} = -.55$;

(c3) $\sum_{t'=7/15}^{12/15} \tilde{y}_{t'} = 700$;

(d) $48 \leq \tilde{X}_{2,7/15} \leq 52$.

When using CPLEX, which is an optimization tool, to solve the above problem, the solutions (V1 mod=$\tilde{V}_{1,t}$, V2 mod=$\tilde{V}_{2,t}$, X1 mod=$\tilde{X}_{1,t}$, X2 mod=$\tilde{X}_{2,t}$, ymod=$\tilde{y}_t$) can be shown as follows:

V1 mod [4.1616 7.257 7.1411 4.7185 3.1095 5.8864 8.3187 5.4128]

V2 mod [69.131 68.146 75.528 88.603 88.063 104.73 104.46 97.588]

X1 mod [50 55 59.975 51.72 56.368 58.682 53.247 59.733]

X2 mod [45 45 51.981 79.241 57.863 55.228 59.005 45.987]

ymod [95 90 102.48 109.19 110.02 127.22 131.07 120.02]

The tabular output of the solution may be shown as illustrated in Table 4, wherein the numbers in bold represent values specified by the user or within a range specified by the user, and the rest of the numbers represent updated forecast values resulting from the analysis:

TABLE 4

Updated forecasting values for Sales, Twitter# and Facebook#

| Metrics | July 2015 | August 2015 | September 2015 | October 2015 | November 2015 | December 2015 |
|---|---|---|---|---|---|---|
| Sales | 102 | 109 | 110 | 127 | 131 | 120 |
| Twitter# | 60 | 52 | 56 | 59 | 53 | 60 |
| Facebook# | 52 | 79 | 57 | 55 | 59 | 46 |

\* Sum of Sales forecasts from July 2015 to December 2015 = 700

The solution to the optimization problem (i.e., the updated set of forecast values for the forecasting period of interest) is presented to the user in step 212 (e.g., via a graphical user interface and at least one server system 10 and/or a client system 14). The solution can be presented in many ways. For example, the solution can be presented to the user in one or more tables (e.g., like Table 4 above), one or more visualizations (e.g., graphs, charts, etc.), an interactive user interface, or a combination of two or more of the foregoing. In an embodiment, the results may be presented in real time on the user's display. In another embodiment, the presentation may be included in a report that is electronically sent to the user. The mode of presentation may be pre-defined by the system, or the system may be configured to allow users to specify the mode of presentation. For example, options may be provided to the user to cause the system to present fewer than all of the forecasted values (e.g., for a particular month), or to show both the original and updated forecast values, or to show the results in multiple windows, etc.

In an embodiment, the system may additionally be configured to initiate, based on the updated set of forecast values, a computer process to achieve at least one of the goals for the target metric by influencing a value of at least one the predictors. For example, in the example above in which the target metric is sales and the predictors are Twitter and Facebook mentions, the system may be configured to affect Twitter and/or Facebook mentions, e.g., by initiating a process (such as a bot) to post messages on Twitter and/or Facebook.

It is also possible that the system might fail to find a solution. The system can be configured to handle all of these outcomes and to present the results to the user in a way that makes the prescriptive actions readily understood by the user.

Figure 3:
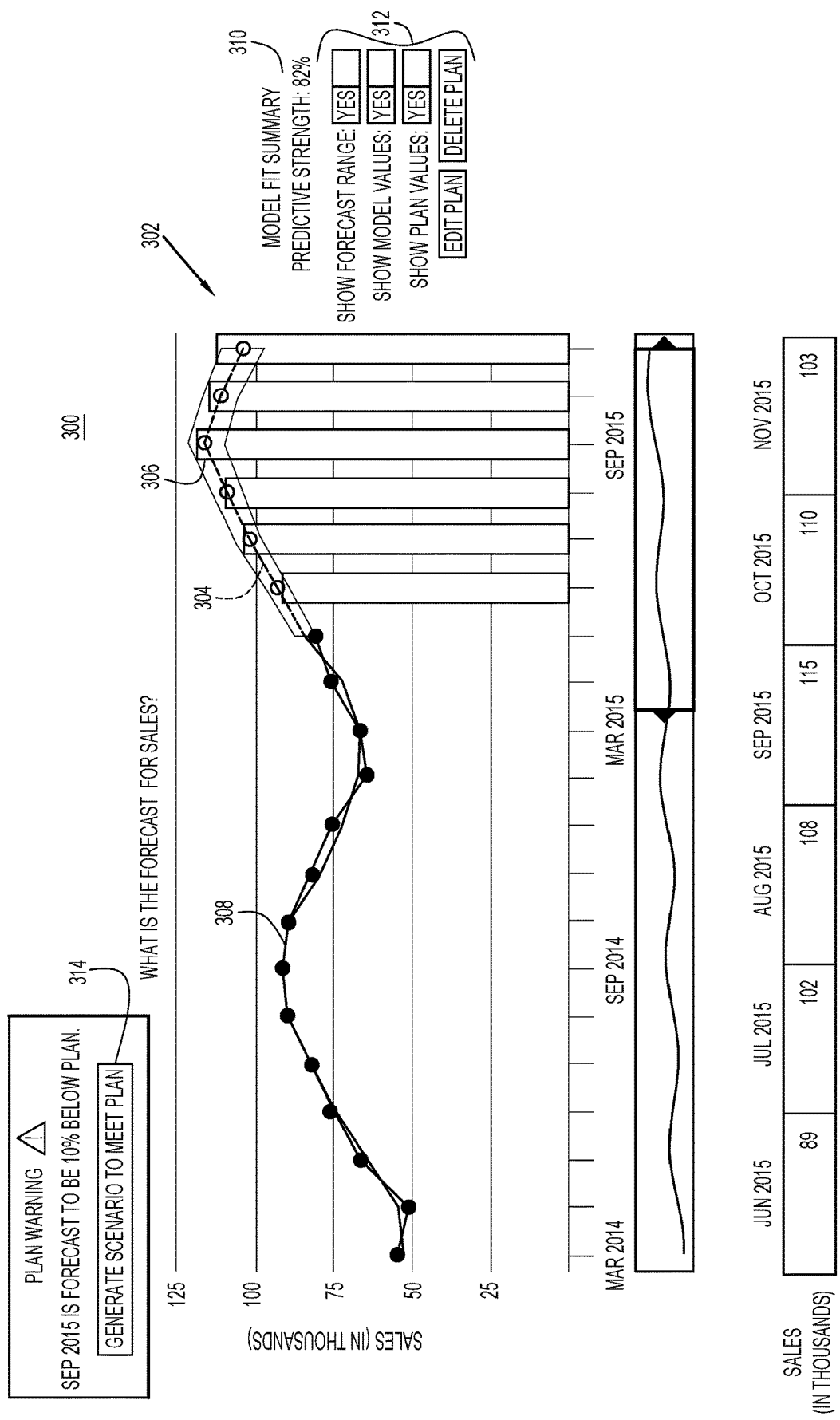
FIG. 3 is a diagrammatic illustration of an example of a user interface for displaying an original forecast versus a plan and initiating what-if and goal seeking analyses according to an embodiment of the present invention.

FIGS. 3-12 are diagrammatic illustrations of example graphical user interfaces that may be used in a prescriptive forecasting system that combines what-if and goal seeking analyses. In FIG. 3, an example user interface 300 for displaying an original forecast versus a plan and initiating a what-if and goal seeking analyses is shown. The user interface 300 includes a graph 302 showing the original forecast for a target metric (in this example, sales) over a forecasting period, and a plan for the target metric over the same forecasting period. In this example, the original forecasts are shown as a dotted line graph 304 and the plan values are shown as a bar graph 306. The example also shows the forecast line graph 304 plotted against a solid line graph 308 of historical time series data for a historical time period before the forecasting period of interest. To the right of the graph 302 in FIG. 3 is model fit summary 310 indicating the predictive strength of the model and selectable buttons 312 that permit the user to select whether or not to display, the forecast range, the model values and/or the plan values. The user interface 300 in FIG. 3 also includes a button, icon, or other image 314 that may be selected by the user to initiate what-if and goal seeking analyses in which a plan scenario may be generated.

Figure 4:
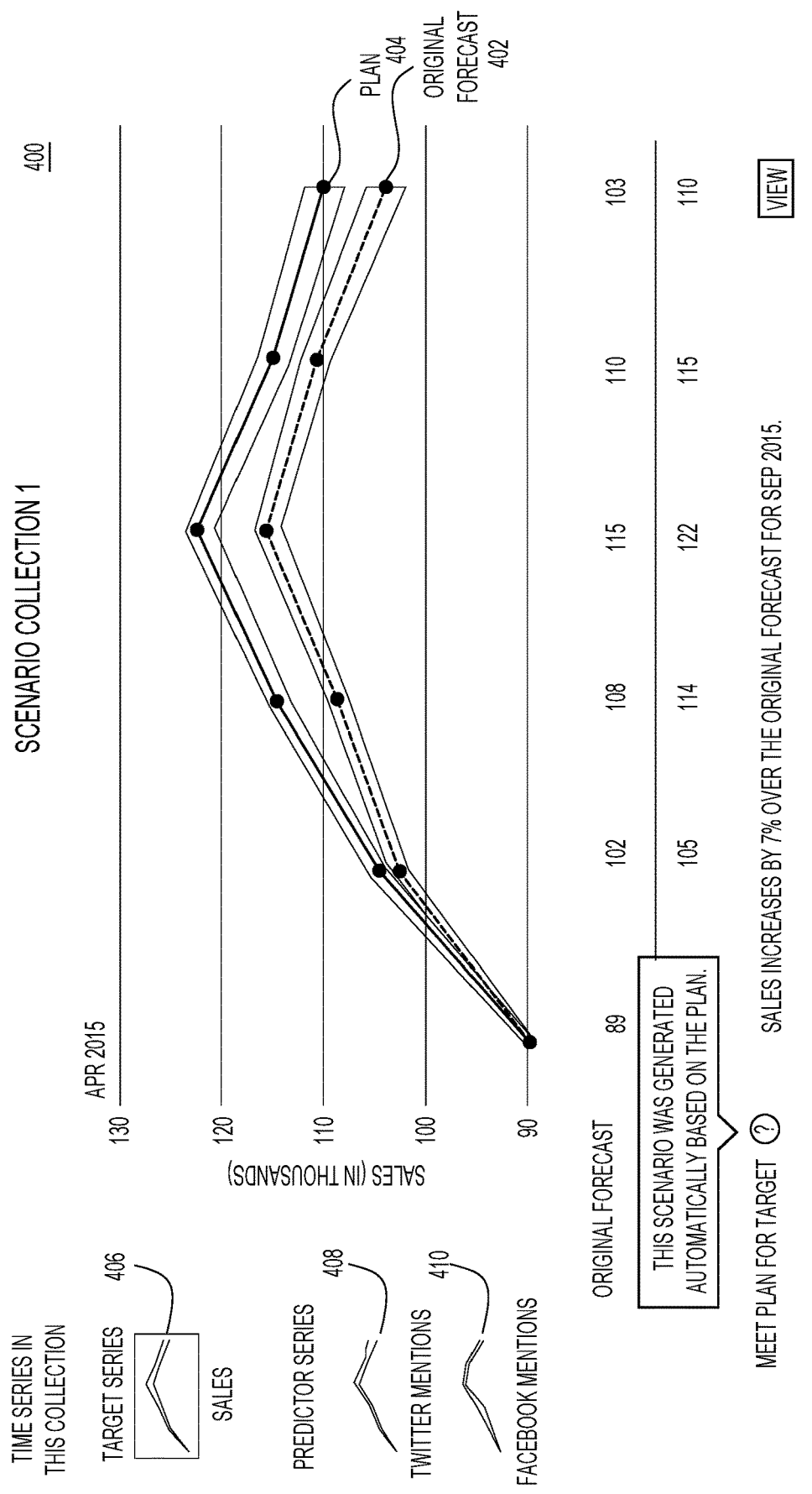
FIG. 4 is a diagrammatic illustration of an example of a user interface for displaying an original forecast versus a plan according to a first scenario and options for viewing the time series or adding a new scenario according to an embodiment of the present invention.

FIG. 4 shows an example user interface 400 for displaying an original forecast 402 versus a plan 404 according to a first scenario and options for viewing the time series or adding a new scenario according to an embodiment of the present invention. In this example, the forecast 402 and plan 404 for sales as a function of time are plotted as lines. To the left of the plot are user-selectable views 406, 408, and 410 allowing the user to switch between views of the target series (e.g., sales) and the predictor series (e.g., Twitter mentions or Facebook mentions). In the example shown, the user has selected the target series for viewing. The interface 400 also includes a user-selectable button 412 that may be selected by the user to initiate what-if and goal seeking analyses in which another scenario may be generated.

FIG. 5 shows an example user interface 500 for selecting one or more predictors when creating a new scenario according to an embodiment of the present invention. The user interface 500 displays the predictors as a row of selectable icons (e.g., an icon 502 for Twitter mentions and icon 504 for Facebook mentions) and displays an interactive table 506 showing the original forecasted values for the target metric (e.g., sales) and the predictors (e.g., Twitter mentions and Facebook mentions) over the forecasting period. The table 506 is configured to allow the user to click on a displayed value to lock the value or constrain the value to a specified range. The user interface 500 also includes a user-selectable button 508 for initiating an update of the forecast based on the locked or constrained values of the target and the selected predictor(s).

Figure 6:
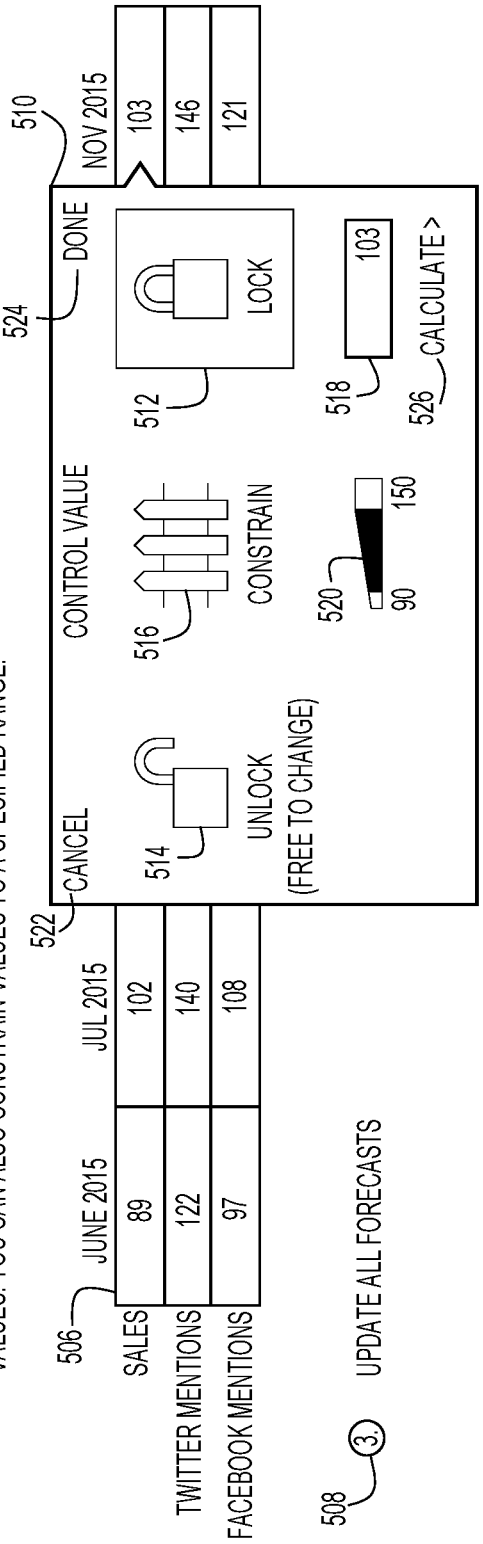
FIG. 6 is a diagrammatic illustration of an example of a user interface for locking a forecasted value of a target metric when creating a new scenario according to an embodiment of the present invention.

FIG. 6 shows an example pop-up window 510 that may be displayed in user interface 500 when a value in table 506 is selected by a user. The pop-up window 510 includes a user-selectable icon 512 for locking the selected value so that it is not allowed to change when the forecast is updated (while the other values are allowed to change), a user-selectable icon 514 for unlocking a previously locked value, and a user-selectable icon 516 to constrain the selected value to a specified range. In the example shown, the selected value is for the target metric (e.g., sales). In particular, the value of sales for November 2015 is locked at a value 103 entered into a field 518 in the pop-up window. By way of contrast, if the constrain icon 516 was selected, a range of values may be specified using fields or an interactive range bar 520 as shown. In the example shown, the pop-window also includes selectable button 522 for canceling the action and selectable button 524 for closing the window when the action is done. The pop-up window may also include a button 526 that a user may select in order to calculate a value which is described below with reference to FIG. 7.

Figure 7:
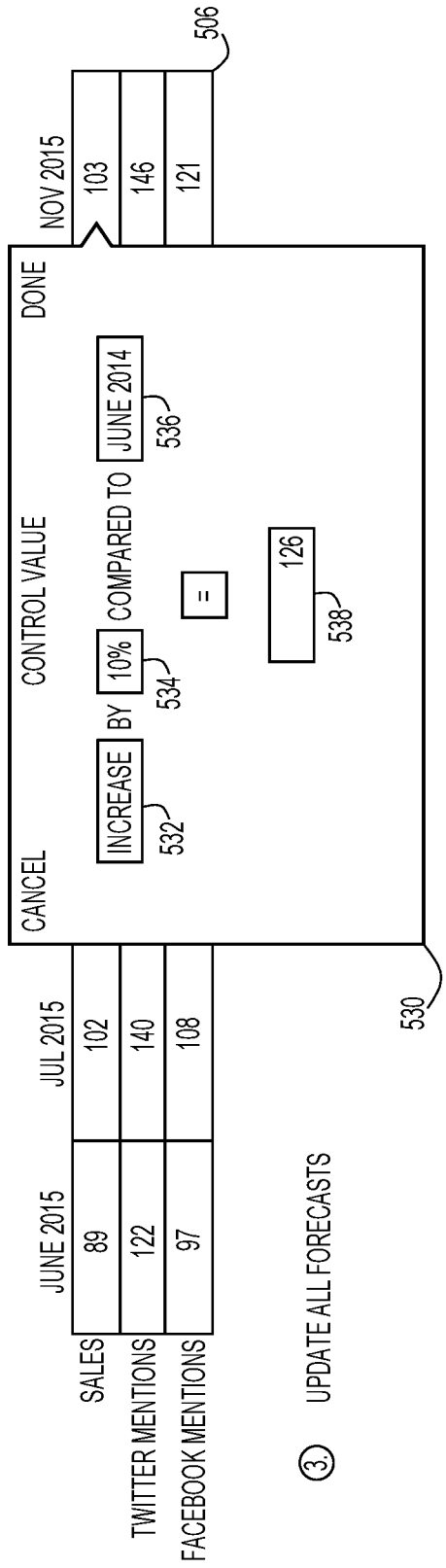
FIG. 7 is a diagrammatic illustration of an example of a user interface for specifying a change in value of a target metric when creating a new scenario according to an embodiment of the present invention.

FIG. 7 shows an example pop-up window 530 that may be displayed in user interface 500 for specifying a change in value of a selected target metric in table 506 after clicking the button 526 according to an embodiment of the present invention. Pop-up window 530 includes a field 532 for specifying how the value should be adjusted (e.g., increase), a field 534 for specifying a percentage for the adjustment (e.g., 10%), and a field 536 for specifying a reference or base value (e.g., compared to June 2014). Pop-up window 530 also includes a field 538 showing an adjusted value calculated by the system according to the conditions entered by the user in fields 532, 534 and 536. In the example shown, the pop-window also includes selectable button 522 for canceling the action and selectable button 524 for closing the window when the action is done.

FIG. 8 shows user interface 500 with the adjusted target value 540 in the November 2015 entry in table 506 after the pop-up window 530 is closed. In an example embodiment, an icon 542 (e.g., a padlock) is displayed next to the adjusted value 540 to indicate the value is locked.

Figure 9:
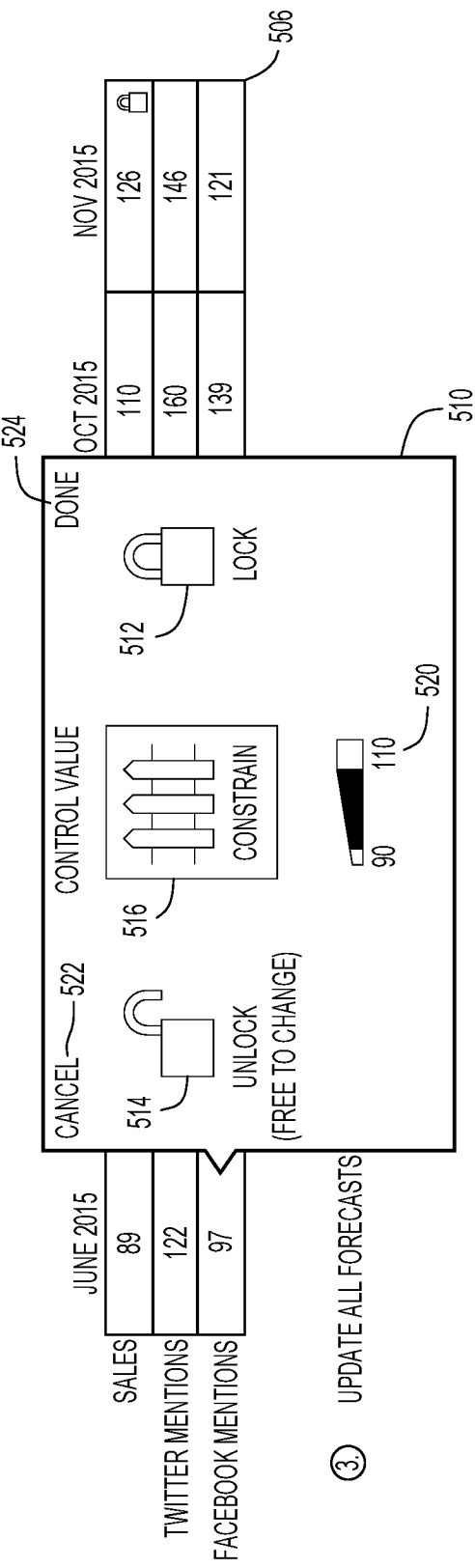
FIG. 9 is a diagrammatic illustration of an example of a user interface for imposing a constraint on the value of a predictor when creating a new scenario according to an embodiment of the present invention.

FIG. 9 shows pop-up window 510 being displayed when the user selects a predictor value in table 506. Again, the pop-up window 510 includes a user-selectable icon 512 for locking the selected value so that it is not allowed to change when the forecast is updated (while the other values are allowed to change), a user-selectable icon 514 for unlocking a previously locked value, and a user-selectable icon 516 to constrain the selected value to a specified range. The pop-up window also includes a selectable button 522 for canceling the action and a selectable button 524 for closing the window when the action is done. In the example shown, the selected value is for one predictor (e.g., Facebook mentions). In particular, the value of Facebook mentions for June 2015 is constrained between 90 and 110 entered in an interactive range bar 520 in the pop-up window.

FIG. 10 shows user interface 500 after the pop-up window 550 in FIG. 9 is closed. In an example embodiment, an icon 554 (e.g., a fence) is displayed next to the previously selected predictor value 552 in table 506 to indicate that a constraint has been placed on the value. The user interface 500 may also display a user-selectable feature 508 (e.g., a button) to cause the system to update all forecasts, based on the locks and/or constraints entered by the user, when creating a new scenario according to an embodiment of the present invention.

FIG. 11 shows an example of how user interface 500 may display updated forecasted values for a new scenario after the user has imposed locks and constraints on one or more values in table 506 and instructed the system to update all forecasts. In the example shown in FIG. 11, the updated forecasted values are shown as three graphs below the update feature 556. For example, a first graph 560 may display the original forecasted values and the updated forecasted values for the target metric, a second graph 562 may display original and updated forecasted values for a first predictor (e.g., Twitter mentions), and a third graph 564 may display the original and updated forecasted values for a second predictor (e.g., Facebook mentions). While line graphs are shown, it will be appreciated that the updated forecasted values may be displayed using other visualizations such as tables, bar charts, pie charts, etc. The example user interface 500 shown in FIG. 11 may also include a user-selectable feature 566 (e.g., a button) to save the scenario (e.g., to a database) for future review and/or modification.

It will be appreciated that the embodiments described above and illustrated in the drawings represent only a few of the many ways of combining what-if and goal seeking analyses in a prescriptive forecasting system.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, modeling module, analysis module, etc.). These systems may include any types of monitors and input devices (e.g., keyboard, mouse, voice recognition, etc.) to enter and/or view information.

It is to be understood that the software (e.g., modeling module, analysis module, modules 16 and 18, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., modeling module, analysis module, modules 16 and 18, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., historical time series data). The database system may be implemented by any number of any conventional or other databases, data stores or storage structures (e.g., files, databases, data structures, data or other repositories, etc.) to store information (e.g., historical time series data). The database system may be included within or coupled to the server and/or client systems. The database systems and/or storage structures may be remote from or local to the computer or other processing systems, and may store any desired data (e.g., historical time series data).

The present invention embodiments may employ any number of any type of user interface (e.g., Graphical User Interface (GUI), command-line, prompt, etc.) for obtaining or providing information (e.g., target values and/or constraints), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific target metrics or predictors described above, but may be utilized to forecast other types of target metrics using other types of predictor series. For example, instead of sales, the present invention embodiments may be used to forecast other target metrics such as expenses, earnings, customer satisfaction ratings, and popular opinion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system for prescriptive time-series forecasting, comprising:
   at least one processor configured to:
      automatically identify a set of predictors for a target metric by obtaining historical time-series data for the target metric and building an autoregression model using the historical time-series data, wherein each predictor of the set of predictors is identified at least in part based on an effect of the predictor on the target metric, and wherein the historical time-series data is automatically obtained, via a webcrawler, from one or more remote online data sources;
      build, based on the historical time-series data, a forecasting model for the target metric with the set of predictors;
      compute, using the forecasting model, a set of forecast values for each predictor of the set of predictors and for the target metric;
      display, in an interactive user interface, the set of forecast values, the target metric, and a user-selectable scenario creation field;
      display, in an interactive user interface in response to a user's selection of the scenario creation field, the set of predictors identified by the system and user-selectable controls for defining a constraint that is imposed on one or more predictors of the set of predictors and a type of the constraint imposed;
      receive from the user, via the interactive user interface, a set of constraints for the set of predictors;
      analyze, using the set of forecast values with respect to a forecasting period, both a set of goals for the target metric and the set of constraints for the set of predictors, wherein the set of constraints are applied to the forecast values computed using the forecasting model;
      update, to meet the set of goals for the target metric within the set of constraints for the set of predictors, the set of forecast values dynamically with respect to the forecasting period; and
      present, with respect to the forecasting period, the updated set of forecast values.

2. The system of claim 1, wherein the at least one processor is configured to build the forecasting model based on the system-selected set of predictors and a user-input set of predictors.

3. The system of claim 1, wherein the set of constraints includes at least one selected from a group comprising a set of user-expected values and a threshold range of change.

4. The system of claim 1, wherein the updated set of forecast values minimizes a change from at least one selected from a group comprising the set of forecast values of both of the target and the predictors.

5. The system of claim 1, wherein the at least one processor is configured to present by displaying to a user at least one selected from a group comprising a table, a visualization, and an interactive user interface.

6. The system of claim 1, wherein the at least one processor is further configured to receive from a user via a user interface, prior to analyzing, at least one selected from a group comprising the set of goals for the target metric and the set of constraints for the set of predictors.

7. A computer program product for prescriptive time-series forecasting, the computer program product comprising one or more non-transitory computer readable storage media collectively having program instructions embodied therewith, the program instructions executable by a computer processor to cause the computer processor to:

automatically identify a set of predictors for the target metric by obtaining historical time-series data for a target metric and building an autoregression model using the historical time-series data, wherein each predictor of the set of predictors is identified at least in part based on an effect of the predictor on the target metric, and wherein the historical time-series data is automatically obtained, via a webcrawler, from one or more remote online data sources;

build, based on historical time-series data, a forecasting model for a target metric with a set of predictors;

compute, using the forecasting model, a set of forecast values for each predictor of the set of predictors and for the target metric;

display, in an interactive user interface, the set of forecast values, the target metric, and a user-selectable scenario creation field;

display, in an interactive user interface in response to a user's selection of the scenario creation field, the set of predictors identified by the system and user-selectable controls for defining a constraint that is imposed on one or more predictors of the set of predictors and a type of the constraint imposed;

receive from the user, via the interactive user interface, a set of constraints for the set of predictors;

analyze, using the set of forecast values with respect to a forecasting period, both a set of goals for the target metric and the set of constraints for the set of predictors, wherein the set of constraints are applied to the forecast values computed using the forecasting model;

update, to meet the set of goals for the target metric within the set of constraints for the set of predictors, the set of forecast values dynamically with respect to the forecasting period; and present, with respect to the forecasting period, the updated set of forecast values.

8. The computer program product of claim 7, wherein the program instructions include instructions executable by a computer processor to cause the computer processor to build the model based on the system-selected set of predictors and a user-input set of predictors.

9. The computer program product of claim 7, wherein the set of constraints includes at least one selected from a group comprising a set of user-expected values and a threshold range of change.

10. The computer program product of claim 7, wherein the updated set of forecast values minimizes a change from at least one selected from a group comprising the set of forecast values of both of the target and the predictors.

11. The computer program product of claim 7, wherein the program instructions include program instructions executable by a computer processor to present by displaying to a user at least one selected from a group comprising a table, a visualization, and an interactive user interface.

12. The computer program product of claim 7, further comprising program instructions executable by a computer processor to receive from a user via a user interface, prior to analyzing, at least one selected from a group comprising the set of goals for the target metric and the set of constraints for the set of predictors.

13. The system of claim 1, wherein the at least one processor is configured to automatically initiate, based on the updated set of forecast values and the user-selected constraints on the set of predictors, a computer process to interact over the Internet with a remote online data source associated with at least one of the predictors to achieve at least one of the goals for the target metric by influencing a value of at least one the predictors via the remote online data source.

14. The system of claim 13, wherein at least one of the predictors includes a number of messages posted on a social media website and wherein the at least one computer processor is configured to automatically initiate a computer process over the Internet by automatically running a posting bot to post messages on the social media website.

15. The computer program product of claim 7, wherein the program instructions include program instructions executable by a computer processor to automatically initiate, based on the updated set of forecast values and the user-selected constraints on the set of predictors, a computer process to interact over the Internet with a remote online data source associated with at least one of the predictors to achieve at least one of the goals for the target metric by influencing a value of at least one the predictors via the remote online data source.

16. The computer program product of claim 15, wherein at least one of the predictors includes a number of messages posted on a social media website and wherein the program instructions executable by a computer processor to automatically initiate a computer process over the Internet include program instructions executable by a computer processor to automatically run a posting bot to post messages on the social media website.

17. The system of claim 1, wherein the autoregression model used to identify the set of predictors comprises an autoregressive integrated moving average (ARIMA) model.

18. The computer program product of claim 7, wherein the autoregression model used to identify the set of predictors comprises an autoregressive integrated moving average (ARIMA) model.

\* \* \* \* \*